Sept. 13, 1966 W. K. KRAUTH, JR 3,272,531

TELEPHONE PAD HOLDER

Filed July 27, 1964

INVENTOR.
WALTER K. KRAUTH, JR

BY Newton, Hopkins & Jones
ATTORNEYS

United States Patent Office 3,272,531
Patented Sept. 13, 1966

3,272,531
TELEPHONE PAD HOLDER
Walter K. Krauth, Jr., 2631 Mayflower Road, College Park, Ga.
Filed July 27, 1964, Ser. No. 385,306
3 Claims. (Cl. 281—15)

This invention relates to a telephone pad holder and is particularly concerned with a holder for memorandum pads or collated memorandum sheets which may be readily applied to and detached from the base of present day conventional hand set telephone instruments.

One problem which repeatedly arises in connection with memorandum pads and holders therefor for telephone instruments is the provision of simple, efficient and effective means for securing such pads or holders to the instrument. Obviously, when not secured the pad and its holder are easily misplaced or lost; however, such securing means as have been proposed heretofore have, for the most part, been complicated structures, involved multiple parts and have required attaching operations of tedious and time consuming nature. Further, such holders have not satisfactorily met a demand for accommodation to varying dimensions of structural configuration of the instrument and in many instances manufacturing costs have been prohibitive.

In the structural embodiment of the present inventive concept, here set forth by way of example, a single piece of yieldable, resilient material is formed to provide an edge configuration acting both as means for retaining a ad of memorandum paper, or sheets thereof, on the body of the device and as a means for releasably retaining the device, by frictional or resilient retention, in the conventional finger grip recess at the top of a telephone instrument base directly beneath the hand set receiving cradle.

More particularly, the edge is of return bent configuration, substantially C shaped in cross-section. The C shaped edge is formed as an integral extension of the flat pad receiving body which supports the correlated sheets or the pad. The free or open end of the C shaped formation extends downwardly toward the flat base portion to form a bight for engaging the sheets and retaining them in their intended position over the body. The external configuration of the return bend defines at one side spaced ribs to engage one inner face of the finger grip recess of the telephone base, while its terminal edge is formed with a projecting rib which inter-locks with the usual internal edge rib of the upper face of the finger grip recess of the telephone base. It is to be further noted, that since the retaining return bent portion of the device extends outwardly and away from the plane of the lower face of the body the holder with memorandum sheets retained therein may, when detached, lay flat on a desk or telephone table for use for memorandum purposes without attachment to an instrument. A further feature of the present invention is that the size and configuration is such that the device, upon detachment, may be conveniently carried in a usual pocket of the user's apparel.

From the foregoing, it will be seen that the primary object of the present invention is to provide a novel, simple, effective, efficient and inexpensive telephone pad holder. A further object of the present invention is to provide a holder which may be readily attached to and detached from the base of a conventional telephone instrument. More specifically, it is an object of the present invention to provide a holder of the type set forth, with means for readily attaching and detaching the device within the usual finger grip recess of the base of a conventional hand set telephone instrument. A further object of the present invention, is to provide a holder adapted to receive and engage varying thicknesses of memorandum pads or correlated memorandum sheets.

It is also an object of the present invention to provide a telephone pad holder including a holder edge, the effective thickness of which may be varied in accordance with the number of sheets secured therein, and which may thus, be adjusted to conform with various widths of the receiving recesses within which the device may be resiliently or frictionally engaged. It is a further object of the invention to provide a telephone pad holder which may be inverted when not in use to be retained by the instrument in inverted position thus, guarding and protecting the paper of the pad and obscuring from view notations on the upper sheet thereof.

Numerous other objects, features and advantages of the present invention will be apparent from consideration of the following specification when taken in conjunction with the accompanying drawings, in which.

Figure 1:
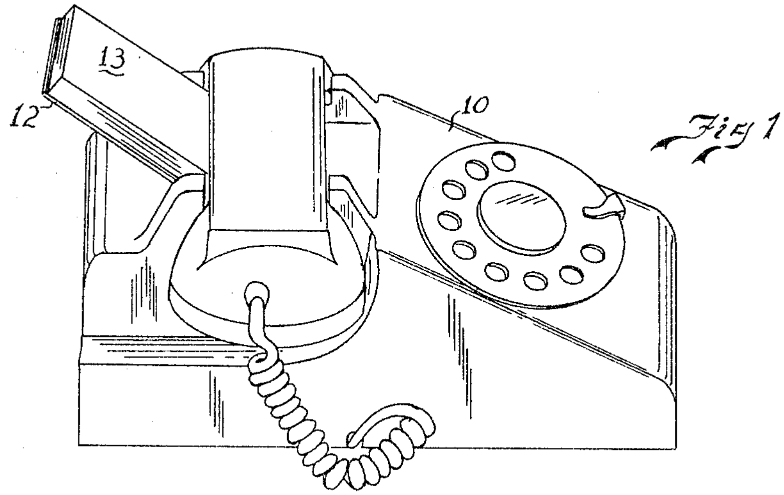
FIG. 1 is a perspective view of a hand set telephone instrument with the pad holder of the present invention mounted on the base thereof in operative position for receiving memorandums.

In the drawings, the numeral 10 indicates the base element of the conventional type of hand set telephone instrument for which the telephone pad holder of the present invention is designed. Such instruments are characterized by the provision of a transversely extending generally rectangular open sided finger receiving slot 11 designed to facilitate lifting and transporting the base member 10. The recess is disposed directly below the cradle area of the upper surface of the base member and between the spaced cradle arms.

The pad holder of the present invention includes a generally rectangular thin flat base or body 12 upon which the sheets 13 of a pad of memorandum paper is disposed. As hereinafter discussed more fully it will be noted that the end edges 14 of the pad of sheets 13 extend beyond the inner end of the flat base area of the body 12 of the retainer. The holder is formed as a continuous integral member being return bent in a generally C shaped configuration at one end edge generally indicated by the numeral 15. The C shaped configuration receives therein the end edges 14 of the sheets of the pad 13 as shown.

In detail, the return bend 15 of the end edge of the base 12 of the holder includes an upwardly and outwardly inclinded straight flight 16 extending from an angled edge 17 at the end of the flat base, to an off set 18 forming an external shoulder 19. From the shoulder 19, the return bend 15 is formed by successive angular flights 20, 21, 22 and 23 of substantial equal angular relation one to another. By this configuration, the terminal edge 24 of the flight 23 confronts, in spaced relation, the support surface of the flat body 12 of the holder adjacent the angled edge 17. At the edge 24 an outwardly projecting rib 25 is formed for cooperative relation with the internal extending rib 26 at the outer edge of the upper surface of the slot 11 when the pad is in operative position as indicated in FIG. 1. When the pad and holder are in inoperative inverted position as in FIG. 4, it will be noted that the shoulder 19 has a similar relationship with the rib 26 as rib 25 has when the holder is in operative position. In the inverted position the rib 25 preforms the function otherwise preformed by the shoulder 19.

Figures 2, 3, 4:
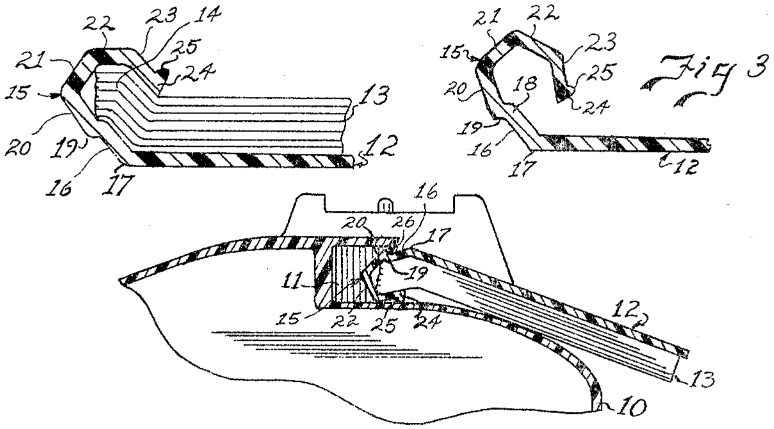
FIG. 2 is a fragmentary sectional view of the present form of the invention shown with the holder receiving and engaging a plurality of memorandum sheets.
FIG. 3 is a view similar to FIG. 2 of the holder empty.
FIG. 4 is a central vertical fragmentary section of the telephone base with the holder and pads disposed therein in inverted position with the flat body of the holder protecting and obscuring the sheets.

By inspection of FIGS. 2 and 3, it will be observed that when the holder is empty as in FIG. 3 and the return bent edge 15 completely relaxed the edge 24, confronting the end of the surface of the body 12 more closely approaches the surface than is the case where the ends 14 of a pad of sheets are inserted within the confines of the return bend 15 as indicated in FIG. 2. Thus, by the insertion of the sheets the return bend is opened or expanded and the resiliency of the material of the holder acts to retain the sheets in position with the ends 14 deformed into conforming configurations with the internal outlines of the major portion of the return bend 15. Since in some instances, the opening of the receiving slot 11 may vary this expansion of the return bend by the insertion of sheets may compensate for varying dimensions of the slot or a like receiving means. Fur-Further, it will be noted that with the expansion of the opening of the return bend C through the insertion of the ends of pad sheets, a constant resilient pressure is exerted on the edges of the sheets to insure adequate and continuous retention of the sheets even though the sheets may not be bound at their edges and despite the successive withdrawal of sheets.

While it is preferable that the body 12, with the return bend 15 be formed as a single integral structure, it will be understood that the shape, dimensions, and material of the holder may widely vary. While thin metal such as aluminum may be used in forming the holder, with return bend provided by stamping, plastic materials such as cellulose acetate or highly density polystyrenes, fiber board, or the like may be employed and formed by an extrusion process. With respect to a preferred size, a base dimension of a length approximately twice the width thereof is suggested. A length of 2 to 3 inches will provide convenient size for pocket use while conforming to the conventional length of the slot 11.

Figure 5:
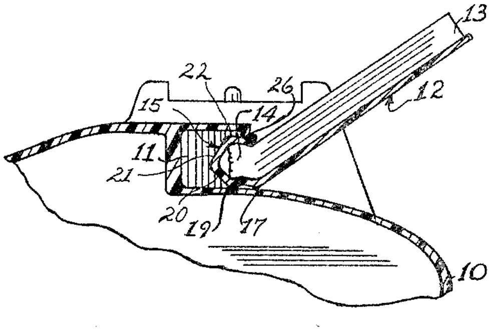
FIG. 5 is similar to FIG. 4 showing the pad and holder in operative position in the manner depicted in FIG. 1.

In use, as connected with the telephone base, the operative position of the holder and pad is as indicated in FIGS. 1 and 5, the return bend 15 being inserted in the slot 11 with the spaced angled edge 17 and the shoulder 19 being received on a flat inner lower surface of the slot. In this position, the rib 25 at the edge 24 of flight 23 will engage the rib 26 at the outer edge of the slot 11. Upon insertion the rib 26 slightly compresses the return bend to provide a yieldable friction engagement precluding accidental displacement of the holder engaged in the slot 11 of the telephone base 17 as shown in FIG. 4. Upon insertion the bottom surface of the body 12 is exposed upwardly protecting the sheets and obscuring from vision any notations which may be on the upper face of the top sheet of the pad. In this relation the edge 17 and shoulder 19 are reversed with the shoulder 19 engaged by the edge rib 26 of the slot and with the rib 25 engaged with the upper surface of the bottom of the slot in such manner as to maintain yieldable and frictional engagement of the return bend within the slot.

It is to be noted that since the entire return bend structure is spaced upwardly and outwardly from the upper surface of the body 12 by the inclined flight 16 from the angle at the edge 17, the pad and holder when disassembled from the telephone base 10 may rest on any appropriate flat surface without interference by the configuration of the return bend. Further, it is to be noted that the projection of the return bend in no way militates against the easy reception of the device within the pocket of the user for use and reference independently of the telephone.

From the foregoing, it is seen that the present invention provides a novel, simple, inexpensive pad holder for easy attachment or removal from a conventional telephone instrument and that the simplicity of construction is such as to assure inexpensive manufacture. The structure is such that by judicious selection of materials a long life of utility may be assured.

It will, of course, be understood by those skilled in the art that many variations may be made in the embodiment chosen for the purpose of illustrating the present invention without departing from the spirit or scope thereof as defined by the appended claims.

What is claimed as invention is:

1. Apparatus for releasable attachment to a conventional telephone base, which base defines a carrying slot having a downwardly projecting lip therein including:

(a) an article to be attached to the telephone base;

(b) a holder for attaching said article to the telephone base, said holder comprising a single integral member having a generally plane support surface and an article receiving edge portion;

(1) said article receiving edge portion having a normal inner dimension approximately the same as the thickness of said article, and (2) a normal outer dimension slightly greater than the vertical dimension of said slot at said lip, (c) whereby when said holder and article are inserted in said recess, a pressure is created between the outer surface of said article receiving portion and the lip and inner surface of said slot and between the inner surfaces of said article receiving portion and said article.

2. Apparatus as defined in claim 1, wherein said article receiving portion is irregular in shape and defines a lip to engage the lip of said slot and an edge and shoulder to engage the bottom of said slot.

3. Apparatus as defined in claim 2, wherein said article receiving portion defines at least one edge to engage said article.

References Cited by the Examiner

UNITED STATES PATENTS

| | | | |
|---|---|---|---|
| 2,488,516 | 11/1949 | Shore | 281—15 |
| 2,791,865 | 5/1957 | Iscoe | 281—15 |
| 2,795,877 | 6/1957 | Falk | 40—336 |

FOREIGN PATENTS

| | | |
|---|---|---|
| 1,179,573 | 12/1958 | France. |

LAWRENCE CHARLES, *Primary Examiner.*